(12) United States Patent
Hayashi

(10) Patent No.: US 8,909,443 B2
(45) Date of Patent: Dec. 9, 2014

(54) SHIFT DEVICE

(71) Applicant: Mitsubishi Jidosha Kogyo Kabushiki Kaisha, Tokyo (JP)

(72) Inventor: Kunishige Hayashi, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/100,587

(22) Filed: Dec. 9, 2013

(65) Prior Publication Data

US 2014/0157931 A1    Jun. 12, 2014

(30) Foreign Application Priority Data

Dec. 11, 2012    (JP) ................................ 2012-270439

(51) Int. Cl.
*F16H 59/10*    (2006.01)
*F16H 61/12*    (2010.01)
*F16H 61/18*    (2006.01)

(52) U.S. Cl.
CPC ............. *F16H 59/105* (2013.01); *F16H 61/12* (2013.01); *F16H 61/18* (2013.01)
USPC ........................................................ 701/58

(58) Field of Classification Search
USPC .................... 701/51, 52, 58; 74/473.1, 473.3
See application file for complete search history.

(56) References Cited

U.S. PATENT DOCUMENTS

| | | | |
|---|---|---|---|
| 5,178,042 A * | 1/1993 | Moroto et al. | 477/65 |
| 2004/0259685 A1 | 12/2004 | Inoue et al. | |
| 2006/0201272 A1 * | 9/2006 | Syamoto et al. | 74/473.1 |
| 2008/0172161 A1 * | 7/2008 | Kondo et al. | 701/66 |
| 2010/0168956 A1 | 7/2010 | Ueno | |
| 2010/0206118 A1 | 8/2010 | Nagashima et al. | |
| 2011/0098881 A1 | 4/2011 | Tsutsumi et al. | |
| 2011/0257852 A1 | 10/2011 | Ishino et al. | |
| 2012/0022756 A1 * | 1/2012 | Ueno et al. | 701/58 |

FOREIGN PATENT DOCUMENTS

| | | |
|---|---|---|
| EP | 2 149 472 A1 | 2/2010 |
| EP | 2 378 164 A1 | 10/2011 |
| JP | 2010-190311 A | 9/2010 |

OTHER PUBLICATIONS

European Search Report mailed Mar. 4, 2014 for Application No. 13196327.4.

* cited by examiner

*Primary Examiner* — Edwin A Young
(74) *Attorney, Agent, or Firm* — Birch, Stewart, Kolasch & Birch, LLP

(57) ABSTRACT

A shift device includes: a shift lever which is installed in a vehicle, and which is configured to automatically return to a reference position from a neutral position; a position detecting unit which is configured to detect that the shift lever is placed at the neutral position; and a setting unit which is configured to: set the vehicle to a neutral state when the shift lever is held at the neutral position for a specified time or more; set the vehicle to the neutral state when the shift lever is placed at the neutral position a plurality of times within a predetermined time.

6 Claims, 3 Drawing Sheets

SHIFT DEVICE

CROSS-REFERENCE TO RELATED APPLICATION(S)

This application is based upon and claims the benefit of priority from prior Japanese patent application No. 2012-270439, filed on Dec. 11, 2012, the entire contents of which are incorporated herein by reference.

BACKGROUND

The present invention relates to a shift device for setting the traveling mode of a vehicle in response to the shift operation performed by the driver.

As one type of the shift levers of vehicles, such as automobiles, there is a shift lever that is configured to automatically return to its home position in a state in which no force is exerted thereto by the driver. This type of shift lever is also referred to as a joystick lever.

In some of vehicles equipped with this type of shift lever, the traveling mode thereof is set to a neutral mode in the case that the shift lever is held at its neutral position for more than a specified time (for example, 1 sec).

A technique for canceling an auto-parking function in the case that the shift operation is performed according to the operation pattern specified as the decryption code is disclosed in JP-A-2010-190311.

In such a vehicle as described above, the driver trying to set the traveling mode to the neutral mode is required to continuously hold the shift lever at the neutral position against the force of returning to the home position. It is assumed that this kind of operation is difficult to be performed accurately in such a case that the driver is in a flurry, and there is a fear that it is difficult to set the traveling mode to the neutral mode quickly.

The technique disclosed in JP-A-2010-190311 is primarily intended to cancel the auto-parking function although the traveling mode is eventually set to the neutral mode in response to the shift operation performed according to the operation pattern specified as the decryption code.

Furthermore, the technique disclosed in JP-A-2010-190311 is developed to solve a problem that the auto-parking function adversely affects work on production line, and the operation pattern specified as the decryption code is configured by the combination of operations not performed during ordinary traveling. As an embodiment described in JP-A-2010-190311, an operation pattern in which a button switch is pressed a threshold number of times Nth (for example, three times) or more in a period after the shift lever is held at its N-range position and until a threshold time Tth (for example, 15 sec) elapses is used as "the operation pattern specified as the decryption code." In other words, the shift operation performed according to the operation pattern specified as the decryption code cannot be easily performed by the driver who is in a flurry wishing and trying to change the traveling mode to the neutral mode.

SUMMARY

The presently disclosed subject matter may provide a shift device in which the possibility that the traveling mode can be set to the neutral mode quickly in response to the operation performed by the driver being in a flurry is enhanced.

The shift device may comprise: a shift lever which is installed in a vehicle, and which is configured to automatically return to a reference position from a neutral position; a position detecting unit which is configured to detect that the shift lever is placed at the neutral position; and a setting unit which is configured to: set the vehicle to a neutral state when the shift lever is held at the neutral position for a specified time or more; set the vehicle to the neutral state when the shift lever is placed at the neutral position a plurality of times within a predetermined time.

The reference position and the neutral position may be arranged linearly, and the setting unit may be configured to set the vehicle to the neutral state when a number of times the shift lever is moved from the reference position to the neutral position is a plurality of times or more within the predetermined time.

The setting unit may be configured to cancel the number of times the shift lever is moved from the reference position to the neutral position when the shift lever is moved from the reference position to a position different from the neutral position.

The specified time may be measured by a hold timer.

The predetermined time may be measured by a wait timer.

The setting unit may count the number of times the shift lever is moved from the reference position to the neutral position.

DETAILED DESCRIPTION OF EXEMPLARY EMBODIMENTS

An automobile provided with a shift device according to an embodiment of the present invention will be described referring to FIGS. 1 to 4. Although a plug-in hybrid automobile is exemplified in this embodiment, the present invention can be embodied similarly in other various types of automobiles.

Figure 1:
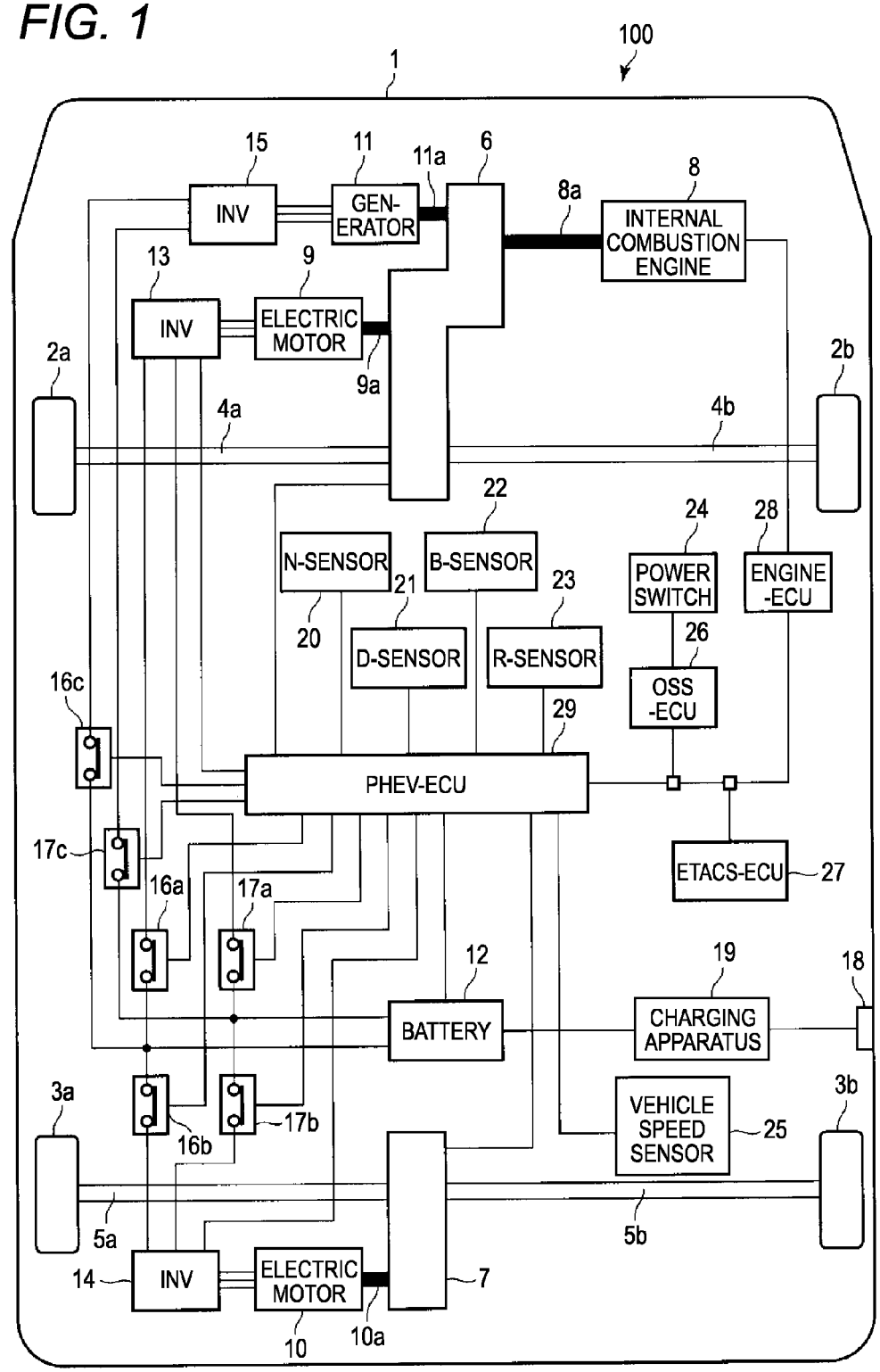
FIG. 1 is a view showing a configuration of an automobile according to an embodiment.

FIG. 1 is a view showing a configuration of an automobile 100. Although the automobile 100 is equipped with numerous components similar to those of other existing plug-in hybrid automobiles, only some of the components are shown in FIG. 1.

The automobile 100 includes a main body 1, front wheels 2a and 2b, rear wheels 3a and 3b, axles 4a, 4b, 5a and 5b, transmission mechanisms 6 and 7, an internal combustion engine 8, electric motors 9 and 10, a generator 11, a battery 12, inverters 13, 14 and 15, contactors 16a, 16b, 16c, 17a, 17b and 17c, an external power supply plug 18, a charging apparatus 19, a neutral position sensor (hereafter referred to as an N-sensor) 20, a drive position sensor (hereafter referred to as a D-sensor) 21, a brake position sensor (hereafter referred to as a B-sensor) 22, a reverse position sensor (hereafter referred to as an R-sensor) 23, a power switch 24, a vehicle speed sensor 25, an OSS-ECU (one-touch start system-electric control unit) 26, an ETACS-ECU (electric time and alarm control system-electric control unit) 27, an engine-ECU (electric control unit) 28, and a PHEV-ECU (plug-in hybrid electric vehicle-electric control unit) 29.

Figure 2:
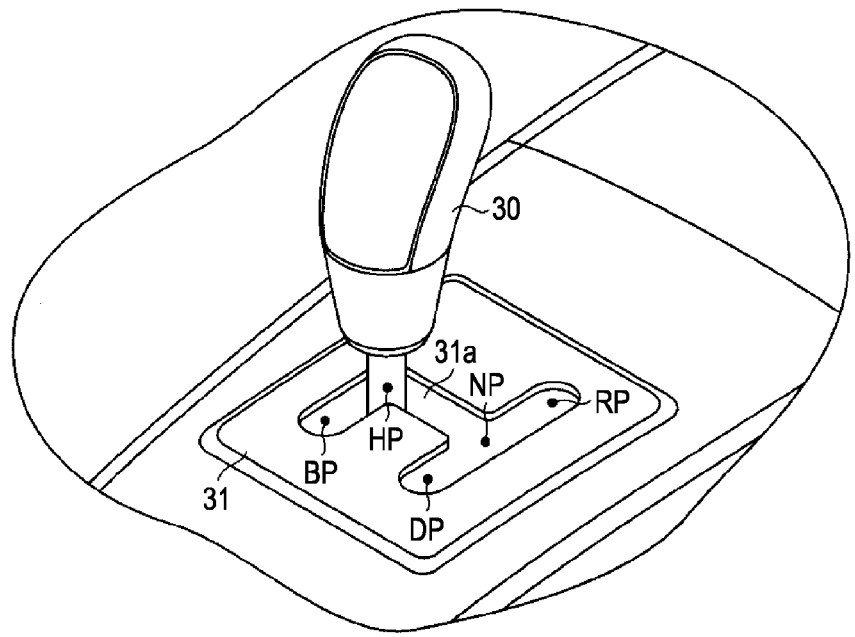
FIG. 2 is a perspective view showing an area around the installation location of a joystick lever inside the compartment of the automobile shown in FIG. 1.

Furthermore, the automobile 100 includes such a joystick-type shift lever (hereafter referred to as a joystick lever) 30 as shown in FIG. 2, for example.

FIG. 2 is a perspective view showing an area around the installation location of the joystick lever 30 inside the compartment of the automobile 100.

The joystick lever 30 is disposed in a state of passing through the guide groove 31a formed in a guide panel 31. In addition, the joystick lever 30 is supported by a known support mechanism, not shown, so as to be movable along the guide groove 31a.

The guide groove 31a allows the joystick lever 30 to be placed at each of a home position (reference position) HP, a neutral position NP, a drive position DP, a brake position BP and a reverse position RP. The above-mentioned support mechanism returns the joystick lever 30 to the home position HP in a situation in which an external force, such as the operating force exerted by the driver, is not applied to the joystick lever 30.

The main body 1 includes a chassis, a vehicle body, etc. and supports other components. In the main body 1, a space for accommodating occupants including the driver is formed.

The front wheels 2a and 2b are secured to the end portions of the axles 4a and 4b, respectively. The rear wheels 3a and 3b are secured to the end portions of the axles 5a and 5b, respectively. The front wheels 2a and 2b and the rear wheels 3a and 3b respectively make contact with the ground to support the main body 1 and rotate to move the main body 1.

The axles 4a and 4b maintain the relative positional relationship of the main body 1 and the front wheels 2a and 2b in a predetermined state and transmits the rotational force transmitted from the transmission mechanism 6 to the front wheels 2a and 2b.

The axles 5a and 5b maintain the relative positional relationship of the main body 1 and the rear wheels 3a and 3b in a predetermined state and transmits the rotational force transmitted from the transmission mechanism 7 to the rear wheels 3a and 3b.

The transmission mechanism 6 rotatably supports the axles 4a and 4b individually. The respective rotation shafts 8a, 9a and 11a of the internal combustion engine 8, the electric motor 9 and the generator 11 are individually connected to the transmission mechanism 6. The transmission mechanism 6 is configured by combining various kinds of gears including a differential gear, shafts and clutches as known in the art, and selectively forms a state in which the rotation shaft 8a is connected to the axles 4a and 4b, a state in which the rotation shaft 8a is connected to the rotation shaft 11a, a state in which the rotational force of the rotation shaft 8a is distributed and transmitted to the axles 4a and 4b and the rotation shaft 11a, a state in which the rotation shaft 9a is connected to the axles 4a and 4b, a state in which the rotation shaft 11a is connected to the axles 4a and 4b, a state in which the axles 4a and 4b are rotated freely, or a state in which the axles 4a and 4b are locked. The locking of the axles 4a and 4b are performed, for example, by mechanically locking the rotation of the shafts provided for the transmission mechanism 6 using a parking lock mechanism provided for the transmission mechanism 6.

The transmission mechanism 7 rotatably supports the axles 5a and 5b individually. The rotation shaft 10a of the electric motor 10 is connected to the transmission mechanism 7. The transmission mechanism 7 is configured by combining various kinds of gears including a differential gear, shafts and a clutch as known in the art, and selectively forms a state in which the rotation shaft 10a is connected to the axles 5a and 5b or a state in which the axles 5a and 5b are rotated freely.

The internal combustion engine 8 uses fuel to generate a rotational force and rotates the rotation shaft 8a. The internal combustion engine 8 typically uses gasoline as fuel, but may use fuel other than gasoline, such as light oil, or gas, such as LPG (liquefied petroleum gas). When the rotation shaft 8a is connected to the axles 4a and 4b via the transmission mechanism 6, the internal combustion engine 8 rotates the front wheels 2a and 2b.

The electric motors 9 and 10 use electric energy to generate rotational forces and rotate the rotation shafts 9a and 10a. When the rotation shaft 9a is connected to the axles 4a and 4b via the transmission mechanism 6, the electric motor 9 rotates the front wheels 2a and 2b. When the rotation shaft 10a is connected to the axles 5a and 5b via the transmission mechanism 7, the electric motor 10 rotates the front wheels 3a and 3b.

The generator 11 uses the rotation of the rotation shaft 11a to generate electricity by electromagnetic induction. When the rotation shaft 8a is connected to the rotation shaft 11a via the transmission mechanism 6, the generator 11 uses the rotational force generated by the internal combustion engine 8 to generate electricity. When the axles 4a and 4b are connected to the generator 11 via the transmission mechanism 6, the generator 11 uses the rotational forces of the axles 4a and 4b to generate electricity.

The battery 12 generates a DC current.

Each of the inverters 13 and 14 converts the DC current output from the battery 12 into an AC current. The inverters 13 and 14 may have a known configuration having switching devices, such as IGBTs. The inverter 13 applies the AC current to the electric motor 9 to supply electric energy to the electric motor 9. The inverter 14 supplies the AC current to the electric motor 10 to drive the electric motor 10. The inverters 13 and 14 change the switching frequencies of the switching devices and the current values (output current values) and the frequencies (output frequencies) of the currents to be output under the control of the PHEV-ECU 29.

The inverter 15 converts the AC current generated by the generator 11 into a DC current. The DC current obtained by the inverter 15 is supplied to the battery 12.

The contactors 16a, 16b and 16c are inserted between the positive terminal of the battery 12 and the inverters 13, 14 and 15, respectively. The contactors 16a, 16b and 16c are used to turn ON/OFF the electrical connections between the positive terminal of the battery 12 and the inverters 13, 14 and 15, respectively, under the control of the PHEV-ECU 29.

The contactors 17a, 17b and 17c are inserted between the negative terminal of the battery 12 and the inverters 13, 14 and 15, respectively. The contactors 17a, 17b and 17c are used to turn ON/OFF the electrical connections between the negative terminal of the battery 12 and the inverters 13, 14 and 15, respectively, under the control of the PHEV-ECU 29.

A cable for receiving electric power from an external power source can be connected to the external power supply plug 18 as necessary. When the cable is connected to the external power supply plug 18, the cable is electrically connected to the charging apparatus 19.

The charging apparatus 19 charges the battery 12 using the electric power supplied from the external power source via the cable connected to the external power supply plug 18.

The N-sensor 20 detects whether the joystick lever 30 is placed at the neutral position NP or at a position other than the neutral position NP and outputs a detection signal indicating the result of the detection.

The D-sensor 21 detects whether the joystick lever 30 is placed at the drive position DP or at a position other than the drive position DP and outputs a detection signal indicating the result of the detection.

The N-sensor 22 detects whether the joystick lever 30 is placed at the brake position BP or at a position other than the brake position BP and outputs a detection signal indicating the result of the detection.

The N-sensor 23 detects whether the joystick lever 30 is placed at the reverse position RP or at a position other than the reverse position RP and outputs a detection signal indicating the result of the detection.

An H-sensor may be provided separately to detect whether the joystick lever 30 is placed at the home position HP or at a position other than the home position HP and to output a detection signal indicating the result of the detection.

The power switch 24 is a switch to be operated by the user to give instructions to start and stop the automobile 100.

The vehicle speed sensor 25 detects the traveling speed of the automobile 100 on the basis of the rotation speed of the axle 5b, for example.

When the user operated the power switch 24, the OSS-ECU 26 performs communication for authentication and then controls the power sources of the respective sections, for example.

The ETACS-ECU 27 controls various electrical components mounted in the automobile 100 but not shown in FIG. 1. The electrical components to be controlled by the ETACS-ECU 27 are headlights, door mirrors, wipers, a door lock mechanism, an indoor lighting fixture and a security alarm, for example. While communicating with the OSS-ECU 26 and the engine-ECU 28 and the PHEV-ECU 29 as necessary and obtaining required information, the ETACS-ECU 27 controls various electrical components to accomplish predetermined operations. As one example of the control, if the door mirrors are in their retracted state when the vehicle speed becomes a specified value or more, the ETACS-ECU 27 opens the door mirrors automatically.

The engine-ECU 28 controls the operation of the internal combustion engine 8. While communicating with the ETACS-ECU 27 and the PHEV-ECU 29 as necessary, the engine-ECU 28 obtains information required for various control processes.

The PHEV-ECU 29 performs various control processes relating to the traveling of the automobile 100. For example, the PHEV-ECU 29 controls the states of the transmission mechanisms 6 and 7 depending on the traveling state of the automobile 100. Furthermore, the PHEV-ECU 29 controls the states of the inverters 13 and 14 and the contactors 16a, 16b, 16c, 17a, 17b and 17c. As one example of the control, in the powering operation state of the EV (electric vehicle) mode of the automobile, the PHEV-ECU 29 sets the transmission mechanism 6 to a state in which the rotation shaft 9a of the electric motor 9 is connected to the axles 4a and 4b, sets the transmission mechanism 7 to a state in which the rotation shaft 10a of the electric motor 10 is connected to the axles 5a and 5b, and turns ON all the contactors 16a, 16b, 16c, 17a, 17b and 17c. In the operation state, the PHEV-ECU 29 calculates a required traveling output depending on the opening of the accelerator detected by an accelerator opening sensor, not shown, and controls of the outputs of the inverters 13 and 14 so as to drive the electric motors 9 and 10 to obtain the traveling output. In addition, the PHEV-ECU 29 controls the states of the transmission mechanisms 6 and 7, the inverters 13 and 14 and the contactors 16a, 16b, 16c, 17a, 17b and 17c so that various operation states having been accomplished by other existing hybrid vehicles can be formed as necessary. While communicating with the ETACS-ECU 27 and the engine-ECU 28 as necessary, the PHEV-ECU 29 obtains information required for the various control processes.

As the basic traveling modes of the automobile 100 under the control of the PHEV-ECU 29, a neutral mode, a drive mode, a brake mode and a reverse mode are applicable selectively. In the neutral mode, no drive power is transmitted to the axles 4a, 4b, 5a and 5b, and the brake is not applied. In the drive mode, drive power is transmitted to at least one of the axles 4a, 4b, 5a and 5b to move the automobile 100 forward. In the brake mode, the rotational resistance of the internal combustion engine 8 or the electric motors 9 and 10 is exerted as a resistance to the traveling of the automobile 100. In the reverse mode, the drive power is transmitted to at least one of the axles 4a, 4b, 5a and 5b to move the automobile 100 backward.

Figure 3:
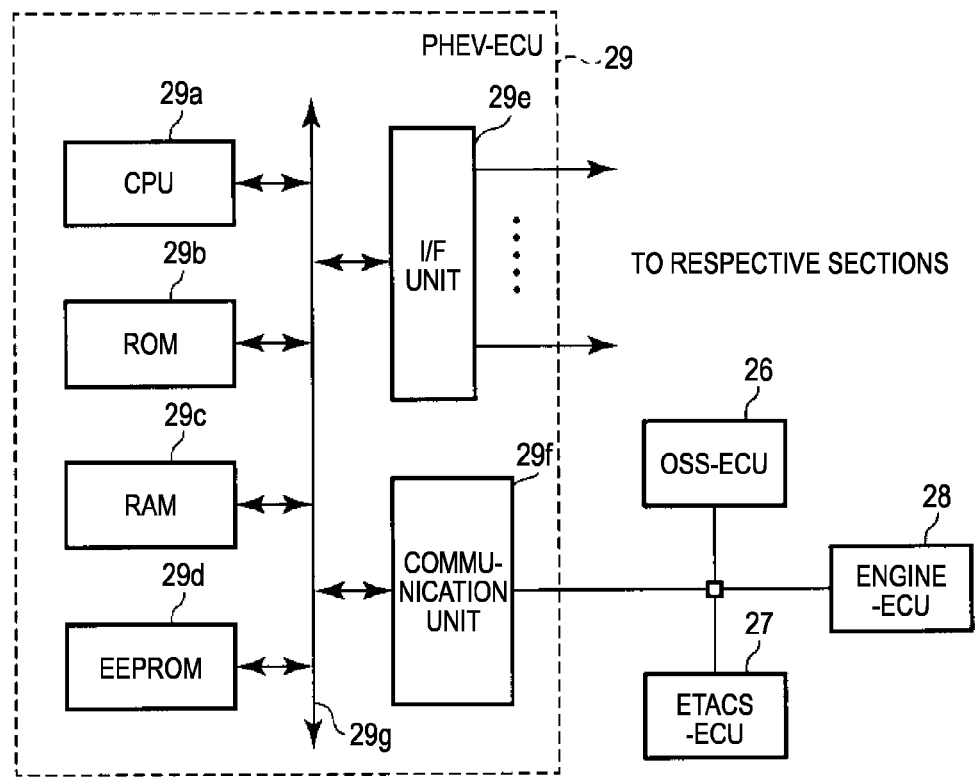
FIG. 3 is a block diagram of the PHEV-ECU shown in FIG. 1.

FIG. 3 is a block diagram of the PHEV-ECU 29. In FIG. 3, the same components as those shown in FIG. 1 are designated by the same reference codes.

The PHEV-ECU 29 includes a CPU (central processing unit) 29a, a ROM (read-only memory) 29b, a RAM (random-access memory) 29c, an EEPROM (electrically erasable programmable read-only memory) 29d, an interface unit (I/F unit) 29e and a communication unit 29f. These components are respectively connected to a bus 29g.

On the basis of the operating system and application programs stored in the ROM 29b and the RAM 29c, the CPU 29a performs information processing to control the operations of the respective components that are controlled by the PHEV-ECU 29.

The ROM 29b stores the above-mentioned operating system. The ROM 29b may store the above-mentioned application programs. Furthermore, the ROM 29b may store data to be referred to when the CPU 29a performs various processes.

The RAM 29c is used as the so-called work area to store data to be used temporarily when the CPU 29a performs various processes.

The EEPROM 29d stores data to be used when the CPU 29a performs various processes and also stores data created by the processing of the CPU 29a. Furthermore, the EEPROM 29d may store the application programs.

The application programs stored in the ROM 29b or the EEPROM 29d include a traveling mode setting program written relating to the traveling mode setting process described later. In the case that the traveling mode setting program is stored in the EEPROM 29d, the transfer of the PHEV-ECU 29, the unit incorporating the PHEV-ECU 29 or the automobile 100 is done generally in a state in which the above-mentioned traveling mode setting program is stored in the EEPROM 29d. However, the PHEV-ECU 29, the unit incorporating the PHEV-ECU 29 or the automobile 100 may be transferred in a state in which the above-mentioned traveling mode setting program is not stored in the EEPROM 29d, and the traveling mode setting program may be recorded in a removable recording medium, such as a magnetic disk, a magneto-optical disk, an optical disk or a semiconductor memory and transferred, or the traveling mode setting program may be transferred via a network, and the traveling mode setting program may be written in the PHEV-ECU 29, the unit incorporating the PHEV-ECU 29 or the EEPROM 29d of the automobile 100 having been transferred separately as described above.

The interface unit 29e is used to physically connect the respective components to be controlled by the PHEV-ECU 29. In other words, the battery 12, the inverters 13 and 14, the contactors 16a, 16b, 16c, 17a, 17b and 17c, the N-sensor 20, the D-sensor 21, the B-sensor 22, the R-sensor 23 and the vehicle speed sensor 25 are connected to the interface unit 29e. The interface unit 29e is used to interface data transmission and reception between the respective connected components and the CPU 29a. In other words, the interface unit 29e has a function serving as a unit for receiving the detection signal output from the N-sensor 20.

The communication unit 29f communicates with the OSS-ECU 26, the ETACS-ECU 27 and the engine-ECU 28.

As described above, the interface unit 29e has a function serving as a unit for receiving the detection signal. Furthermore, the CPU 29a functions serving as a setting unit by executing the traveling mode setting process described later.

Next, the operation of the automobile 100 configured as described above will be described below. Although the automobile 100 has various functions similar to those of other existing automobiles, since the operations relating to the functions are similar to those of the other existing automobiles, their detailed descriptions are omitted. In the following descriptions, the setting of the traveling mode will be described in detail.

Figure 4:
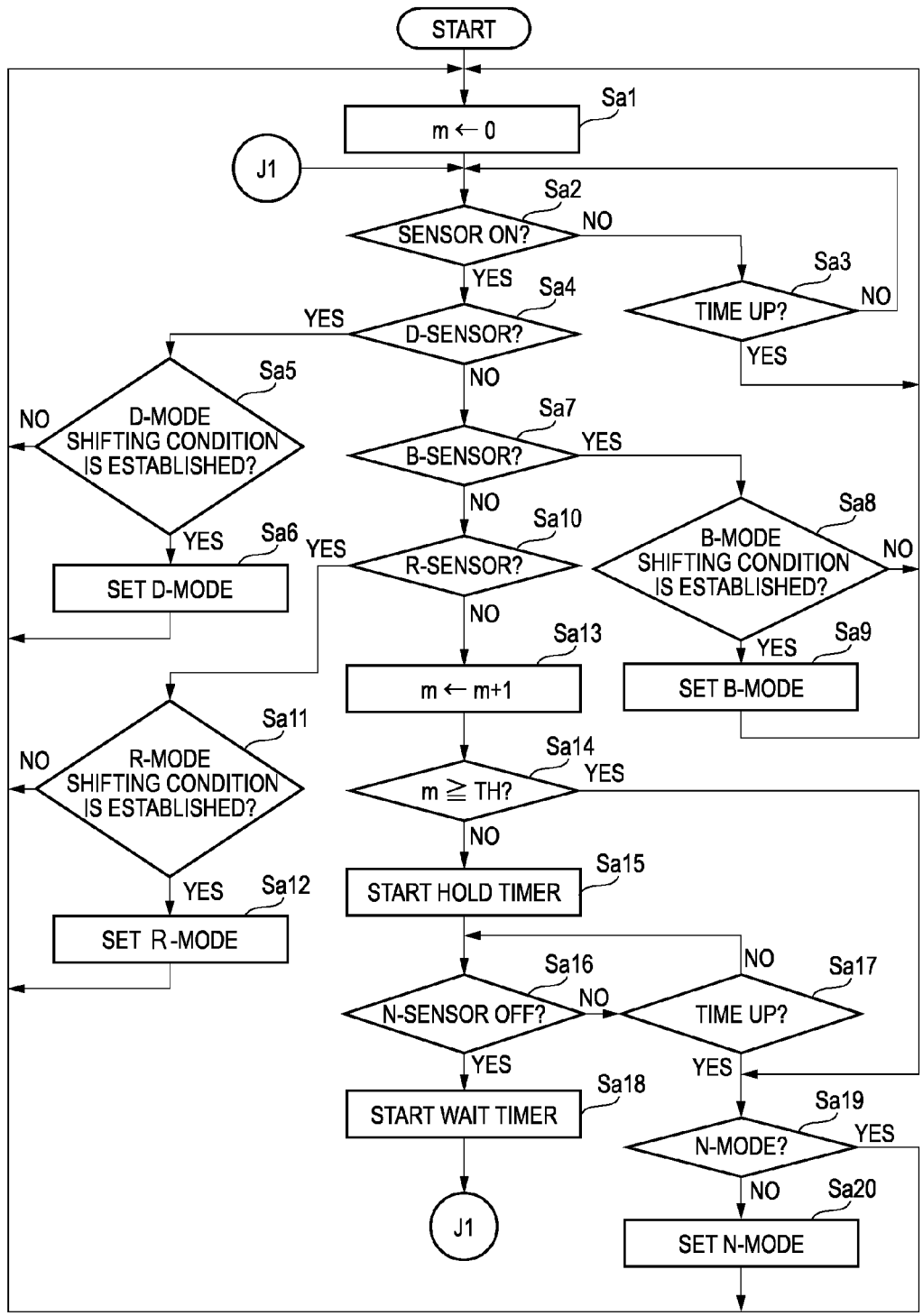
FIG. 4 is a flowchart of a traveling mode setting process.

FIG. 4 is a flowchart of the traveling mode setting process.

When the PHEV-ECU 29 is started, for example, by the control of the power sources of the respective sections executed by the OSS-ECU 26 in response to the operation of the power switch 24, the CPU 29a starts the traveling mode setting process shown in FIG. 4 according to the traveling mode setting program. The content of the process described below is one example, and various processes capable of obtaining similar results can be used appropriately.

At step Sa1, the CPU 29a clears a variable m to 0. The variable m is used to count the number of times the joystick lever 30 is moved continuously to the neutral position NP.

At step Sa2, the CPU 29a checks whether any one of the N-sensor 20, the D-sensor 21, the B-sensor 22 and the R-sensor 23 has newly detected the joystick lever 30. In the following descriptions, with respect to the states of the N-sensor 20, the D-sensor 21, the B-sensor 22 and the R-sensor 23, the state in which the joystick lever 30 has been detected is referred to as ON and the state of no detection is referred to as OFF.

When the joystick lever 30 is operated by the driver and moved to either one of the neutral position NP, the drive position DP, the brake position BP and the reverse position RP, the sensor corresponding to the position changes the state of its detection signal. The CPU 29a receives the detection signals respectively output from the N-sensor 20, the D-sensor 21, the B-sensor 22 and the R-sensor 23 via the interface unit 29e, and monitors the states of the signals. If the judgment at step Sa2 is NO because neither one of the N-sensor 20, the D-sensor 21, the B-sensor 22 and the R-sensor 23 is newly turned ON, the control of the CPU 29a goes to step Sa3.

At step Sa3, the CPU 29a checks whether a wait timer has timed up. The wait timer will be described later. If the judgment is NO because the wait timer has not timed up, the control of the CPU 29a goes back to step Sa2. There is a case in which the wait timer is not started. In this case, the CPU 29a judges NO.

Hence, the CPU 29a waits at steps Sa2 and Sa3 until either one of the N-sensor 20, the D-sensor 21, the B-sensor 22 and the R-sensor 23 is newly turned ON or until the wait timer times up.

If the judgment at step Sa2 is YES because either one of the N-sensor 20, the D-sensor 21, the B-sensor 22 and the R-sensor 23 has been newly turned ON, the control of the CPU 29a goes to step Sa4.

At step Sa4, the CPU 29a checks whether the sensor having been newly turned ON is the D-sensor 21. If the judgment is YES, the control of the CPU 29a goes to step Sa5.

At step Sa5, the CPU 29a checks whether a predetermined condition (D-mode shifting condition) required to be satisfied for the shift to the drive mode has been established. The D-mode shifting condition may be determined as desired, for example, by the designer of the automobile 100. If the judgment is YES because the D-mode shifting condition has been established, the control of the CPU 29a goes to step Sa6.

At step Sa6, the CPU 29a sets the drive mode as the traveling mode.

Then, the control of the CPU 29a goes back to step Sa1. If the judgment at step Sa5 is NO because the D-mode shifting condition has not been established, the control of the CPU 29a goes back to step Sa1 without going to step Sa6.

If the judgment at step Sa4 is NO because the sensor judged to have been newly turned ON at step Sa2 is not the D-sensor 21, the control of the CPU 29a goes to step Sa7.

At step Sa7, the CPU 29a checks whether the sensor having been newly turned ON is the B-sensor 22. If the judgment is YES, the control of the CPU 29a goes to step Sa8.

At step Sa8, the CPU 29a checks whether a predetermined condition (B-mode shifting condition) required to be satisfied for the shift to the brake mode has been established. The B-mode shifting condition may be determined as desired, for example, by the designer of the automobile 100. If the judgment is YES because the B-mode shifting condition has been established, the control of the CPU 29a goes to step Sa9.

At step Sa9, the CPU 29a sets the brake mode as the traveling mode.

Then, the control of the CPU 29a goes back to step Sa1. If the judgment at step Sa8 is NO because the B-mode shifting condition has not been established, the control of the CPU 29a goes back to step Sa1 without going to step Sa9.

If the judgment at step Sa7 is NO because the sensor judged to have been newly turned ON at step Sa2 is not the B-sensor 22, the control of the CPU 29a goes to step Sa10.

At step Sa10, the CPU 29a checks whether the sensor having been newly turned ON is the R-sensor 23. If the judgment is YES, the control of the CPU 29a goes to step Sa11.

At step Sa11, the CPU 29a checks whether a predetermined condition (R-mode shifting condition) required to be satisfied for the shift to the reverse mode has been established. The R-mode shifting condition may be determined as desired, for example, by the designer of the automobile 100. If the judgment is YES because the R-mode shifting condition has been established, the control of the CPU 29a goes to step Sa12.

At step Sa12, the CPU 29a sets the reverse mode as the traveling mode.

Then, the control of the CPU 29a goes back to step Sa1. If the judgment at step Sa11 is NO because the R-mode shifting condition has not been established, the control of the CPU 29a goes back to step Sa1 without going to step Sa12.

If the judgment at step Sa10 is NO because the sensor judged to have been newly turned ON at step Sa2 is not the R-sensor 23, the control of the CPU 29a goes to step Sa13. In other words, if the sensor judged to have been newly turned ON at step Sa2 is the N-sensor 20, the control of the CPU 29a goes to step Sa13.

At step Sa13, the CPU 29a increases the variable m by one. In other words, the variable m is increased by one each time the N-sensor 20 is newly turned ON.

At step Sa14, the CPU 29a checks whether the variable m is a predetermined threshold value TH or more. The threshold value TH may be determined as a value of 2 or more as desired, for example, by the designer of the automobile 100. As one example, it is assumed that the threshold value is "3." If the judgment is NO because the variable m is less than the threshold value, the control of the CPU 29a goes to step Sa15.

At step Sa15, the CPU 29a starts a hold timer. The hold timer is used to measure a predetermined necessary hold time. The necessary hold time may be determined as desired, for example, by the designer of the automobile 100. As one example, it is assumed that the necessary hold time is one sec. However, the hold timer can be implemented as a software timer by using a task process different from the traveling mode setting process performed by the CPU 29a. Furthermore, a software timer or a hardware timer controlled by a processor different from the CPU 29a may also be used as the hold timer.

At step Sa16, the CPU 29a checks whether the N-sensor 20 has been turned OFF. If the judgment is NO because the N-sensor 20 remains ON, the control of the CPU 29a goes to step Sa17.

At step Sa17, the CPU 29a checks whether the hold timer has timed up. If the judgment is NO because the hold timer has not timed up, the control of the CPU 29a goes back to step Sa16.

Hence, the CPU 29a waits at steps Sa16 and Sa17 until the N-sensor 20 is turned OFF or until the hold timer times up.

If the judgment is YES at step Sa16 because the N-sensor 20 has been turned OFF before the hold timer times up, the control of the CPU 29a goes to step Sa18.

At step Sa18, the CPU 29a starts a wait timer. In the case that the turning-ON operation of the N-sensor 20 is newly performed continuously, the wait timer is used to measure a wait time serving as a time allowable for the interval of the operations. The wait time may be determined as desired, for example, by the designer of the automobile 100. As one example, it is assumed that the wait time is 0.5 sec. However, the wait timer can be implemented as a software timer by using a task process different from the traveling mode setting process performed by the CPU 29a. Furthermore, a software timer or a hardware timer controlled by a processor different from the CPU 29a may also be used as the wait timer.

Then, the control of the CPU 29a goes back to steps Sa2 and Sa3 at which the CPU 29a is in the wait state. Hence, in the wait state at steps Sa2 and Sa3, the CPU 29a checks whether the N-sensor 20 is newly turned ON in the period after the N-sensor 20 is turned OFF once and until the wait time elapses. If the judgment at step Sa3 is YES because the wait timer has timed up before the N-sensor 20 is newly turned ON, the control of the CPU 29a goes back to step Sa1. In other words, in this case, the variable m is cleared and the above-mentioned process is repeated.

If the N-sensor 20 has been newly turned ON in the period after the N-sensor 20 is turned OFF once and until the wait time elapses, the CPU 29a increases the variable m by one at step Sa13 without clearing the variable m. As described above, in the case that either one of the D-sensor 21, the B-sensor 22 and the R-sensor 23 has been turned ON, the control of the CPU 29a goes back from either one of steps Sa5, Sa6, Sa8, Sa9, Sa11 and Sa12 to step Sa1, and the CPU 29a clears the variable m to 0. As a result, the variable m is used to represent the number of times the N-sensor 20 is turned ON within the interval not exceeding the wait time and in a state in which neither one of the D-sensor 21, the B-sensor 22 and the R-sensor 23 is turned ON and the N-sensor 20 is turned ON/OFF repeatedly in the middle of the interval.

If the judgment at step Sa14 is YES because the variable m has reached the threshold value TH or larger, the control of the CPU 29a goes to step Sa19. Furthermore, in the wait state at steps Sa16 and Sa17, if the judgment at step Sa17 is YES because the hold timer has timed up before the N-sensor 20 is turned OFF, the control of the CPU 29a goes to step Sa19.

In other words, in the state in which the N-sensor 20 is turned ON/OFF repeatedly within the interval not exceeding the wait time, the number of the ON operation times of the N-sensor 20 has reached a specified value corresponding to the threshold value TH or a larger value, or the N-sensor is turned ON continuously in a period exceeding the necessary hold time, the control of the CPU 29a goes to step Sa19.

At step Sa19, the CPU 29a checks whether the current traveling mode has been set to the neutral mode. If the judgment is No at this step, the control of the CPU 29a goes to step Sa20.

At step Sa20, the CPU 29a sets the neutral mode as the traveling mode.

Then, the control of the CPU 29a goes back to step Sa1. If the judgment at step Sa19 is YES because the neutral mode has already been set as the traveling mode, the control of the CPU 29a goes back to step Sa1 without going to step Sa20.

As described above, in the automobile 100, in the state in which the traveling mode has been set to a mode other than the neutral mode, if the driver operates the joystick lever 30 such that the state in which the joystick lever 30 is placed at the neutral position NP is maintained in a period exceeding the necessary hold time, the traveling mode is changed to the neutral mode.

If no force is exerted to the joystick lever 30 by the driver, the lever returns to the home position HP. Hence, in the case that the driver wishing to change the traveling mode to the neutral mode exerted a force and moved the joystick lever 30 to the neutral position NP once but reduced the force in a flurry before the necessary hold time elapses, the joystick lever 30 returns to the home position HP eventually, and the traveling mode is not switched to the neutral mode. The driver being in a flurry in this kind of situation tends to repeat an operation similar to that described above. In other words, in this kind of situation, the joystick lever 30 is operated so as to be reciprocated quickly between the home position HP and the neutral position NP.

At this time, the state in which the joystick lever 30 is placed at the neutral position NP is not maintained in a period exceeding the necessary hold time, but the traveling mode is changed to the neutral mode. Consequently, with the automobile 100, it is possible to enhance the possibility that the traveling mode can be set to the neutral mode quickly in response to the operation of the driver being in a flurry.

However, in the case that the N-sensor 20 is turned ON frequently to the extent that the N-sensor 20 is turned ON beyond the specified number of times while the interval of the ON operations of the N-sensor 20 is not exceeding the wait time (predetermined time), the traveling mode is set to the neutral mode. For this reason, in the case that the above-mentioned operation is performed at a frequency less than the specified frequency, the traveling mode is not set to the neutral mode in response to the operation, whereby the traveling mode is not set to the neutral mode unnecessarily.

Furthermore, the joystick lever 30 automatically returns to the home position HP, and the home position HP and the neutral position NP are arranged linearly. Hence, in an emergency during driving, it is likely that the driver moves the joystick lever 30 linearly and quickly many times between the neutral position NP and the home position HP while trying to shift the joystick lever 30 to the home position HP. Even in this kind of situation, the traveling mode of the vehicle can be set to the neutral mode securely.

Moreover, when the joystick lever 30 is placed at a position other than the neutral position NP, for example, the drive position DP, while the driver is moving the joystick lever 30 between the home position HP and the neutral position NP, the intension of the driver trying to shift the joystick lever 30 to a position other than the neutral position NP can be reflected by clearing (canceling) the number of the times the joystick lever 30 is placed at the neutral position NP.

This embodiment can be modified variously as described below.

The wait time measured by the wait timer may be changed dynamically depending on the value of the variable m. More specifically, for example, in the case that the driver moves the joystick lever 30 repeatedly to the neutral position NP, the speed of the movement likely tends to become slow gradually. Hence, a modification in which the wait time is made longer as the value of the variable m is larger can be adapted to the above-mentioned tendency.

The process for judging whether the frequency with which the N-sensor 20 is newly turned ON has exceeded a specified frequency can be modified variously, for example, as in the case of a process for checking whether the number of times the N-sensor 20 is newly turned ON has reached a specified number of times in a period until a specified time elapses.

Although the variable m is cleared to 0 in the case that either one of the D-sensor 21, the B-sensor 22 and the R-sensor 23 has been turned ON, this clearing may not be required to be performed. In other words, even if the joystick lever 30 is moved to the drive position DP, the brake position BP or the reverse position RP in the middle the shifting operation, if the frequency with which the N-sensor 20 is newly turned ON exceeds the specified frequency, the traveling mode may be set to the neutral mode. With this configuration, for example, in the case that the driver has moved the joystick lever 30 to the drive position DP or the reverse position RP due to excessive momentum, the variable m is not reset, whereby such an operation can be allowed to be performed and the joystick lever 30 can be moved quickly to the neutral mode. However, in the case that the above-mentioned modification is made when the respective positions of the joystick lever 30 are arranged as shown in FIG. 2, the threshold value TH should be set to 3 or more.

Although the PHEV-ECU 29 has the control functions for the shift device according to the above-mentioned embodiment of the present invention, an ECU other than the PHEV-ECU may have the control functions.

The present invention is not limited to the exact configuration of the above-mentioned embodiment, but the components thereof can be modified and embodied in a range not departing from the gist of the present invention in the implementation stage thereof. Furthermore, various inventions can be accomplished by appropriately combining the plurality of components disclosed in the above-mentioned embodiment. For example, some of all the components used in the above-mentioned embodiment may be deleted. Still further, components ranging over different embodiments may be combined appropriately.

According to an aspect of the invention, it is possible to enhance the possibility that the traveling mode can be set to the neutral mode quickly in response to the operation performed by the driver being in a flurry.

What is claimed is:

1. A shift device comprising:
   a shift lever which is installed in a vehicle, and which is configured to automatically return to a reference position from a neutral position;
   a position detecting unit which is configured to detect that the shift lever is placed at the neutral position; and
   a setting unit which is configured to:
      set the vehicle to a neutral state when the shift lever is held at the neutral position for a specified time or more;
      set the vehicle to the neutral state when the shift lever is placed at the neutral position a plurality of times within a predetermined time.

2. The shift device according to claim 1, wherein
   the reference position and the neutral position are arranged linearly, and
   the setting unit is configured to set the vehicle to the neutral state when a number of times the shift lever is moved from the reference position to the neutral position is a plurality of times or more within the predetermined time.

3. The shift device according to claim 2, wherein
   the setting unit is configured to cancel the number of times the shift lever is moved from the reference position to the neutral position when the shift lever is moved from the reference position to a position different from the neutral position.

4. The shift device according to claim 1, wherein
   the specified time is measured by a hold timer.

5. The shift device according to claim 1, wherein
   the predetermined time is measured by a wait timer.

6. The shift device according to claim 2, wherein
   the setting unit counts the number of times the shift lever is moved from the reference position to the neutral position.

* * * * *